United States Patent [19]

Mori

[11] E Re. 28,463

[45] Reissued July 8, 1975

[54] LIST FINDER WITH INSERTABLE INFORMATION CARDS

[75] Inventor: Chuzo Mori, Tokyo, Japan

[73] Assignee: Carl Manufacturing Company Ltd., Tokyo, Japan

[22] Filed: Sept. 9, 1974

[21] Appl. No.: 504,042

Related U.S. Patent Documents

Reissue of:

[64] Patent No.: 3,820,264
Issued: June 28, 1974
Appl. No.: 316,815
Filed: Dec. 20, 1972

[30] Foreign Application Priority Data

Sept. 28, 1972 Japan ..... 47-112875

[52] U.S. Cl. ..... 40/104.01
[51] Int. Cl. ..... B42f 21/00
[58] Field of Search ..... 40/104.01, 78.05; 281/15 B, 45; 282/8–11

[56] References Cited

UNITED STATES PATENTS

| | | | |
|---|---|---|---|
| 670,217 | 3/1901 | Williams | 282/8 A |
| 681,118 | 8/1901 | Henkle | 281/15 B |
| 1,083,539 | 1/1914 | Housh | 281/45 |
| 1,100,058 | 6/1914 | Dowst | 281/45 |
| 1,763,059 | 6/1930 | McMillan | 402/2 |
| 2,115,537 | 4/1938 | Peter | 40/104.01 |
| 2,488,672 | 11/1949 | Lunn | 282/9 R |
| 2,524,209 | 10/1950 | Pollock | 40/104.01 |
| 2,806,715 | 9/1957 | Smith | 281/15 B |
| 2,818,673 | 1/1958 | Nedbalek | 281/15 B |
| 3,272,531 | 9/1966 | Krauth, Jr. | 281/15 B |

FOREIGN PATENTS OR APPLICATIONS

| | | | |
|---|---|---|---|
| 883,296 | 1961 | United Kingdom | 281/15 B |

*Primary Examiner*—Robert W. Michell
*Assistant Examiner*—John H. Wolff
*Attorney, Agent, or Firm*—Phillips, Moore, Weissenberger, Lempio & Strabala

[57] ABSTRACT

A list finder comprises a holder having a releasable cover pivotally mounted thereon. Retaining means are provided for releasably mounting a plurality of stacked information sheets or cards in the holder to expedite removal thereof for information imprinting purposes. In one embodiment of this invention, a clamping device is pre-applied to an end of the cards prior to their insertion into the holder.

17 Claims, 12 Drawing Figures

LIST FINDER WITH INSERTABLE INFORMATION CARDS

Matter enclosed in heavy brackets [ ] appears in the original patent but forms no part of this reissue specification; matter printed in italics indicates the additions made by reissue.

BACKGROUND OF THE INVENTION

List finders, such as telephone indexes, comprise a plurality of stacked information cards having names, addresses and/or telephone numbers imprinted thereon. The cards are mounted in a holder, having a cover pivotally mounted thereon to selectively expose the cards for information gathering purposes. In order to obtain a selected telephone number, for example, a pointer is moved along the cover and adjacent to a "key" letter whereupon the cover is opened to obtain the desired information.

Conventional list finders do not normally facilitate expeditious and legible entry of a new listing on the cards. Many such list finders attempt to alleviate such problem by mounting the cards in a loose-leaf fashion in the holder by means of holding rings or the like. Repeated removal and replacement of the cards on the rings tends to fray the portions of the cards adjacent to the rings to thus render them unusable in that they become displaced laterally in the holder and interfere with opening and closing of the cover. In addition, normally the cards must be taken out of the holder individually to thus make the task of removal and replacement somewhat laborious.

SUMMARY AND OBJECTS OF THIS INVENTION

An object of this invention is to overcome the above, briefly described problems by providing an economical and noncomplex list finder which is adapted to have information cards thereof expeditiously removed and replaced in the list finder without damaging same. The list finder comprises a holder having a cover pivotally mounted thereon and a plurality of stacked information cards removably mounted in the holder. In one embodiment of this invention, a clamping device is applied to the end of the cards prior to their insertion into the holder, whereas in a second embodiment, the stacked cards, per se, are inserted into the holder. In both such embodiments, cooperating retaining means between the holder and cards compress the cards into a locked position therein.

BRIEF DESCRIPTION OF THE DRAWINGS

Other objects of this invention will become apparent from the following description and accompanying drawings wherein.

DETAILED DESCRIPTION

Figure 1:
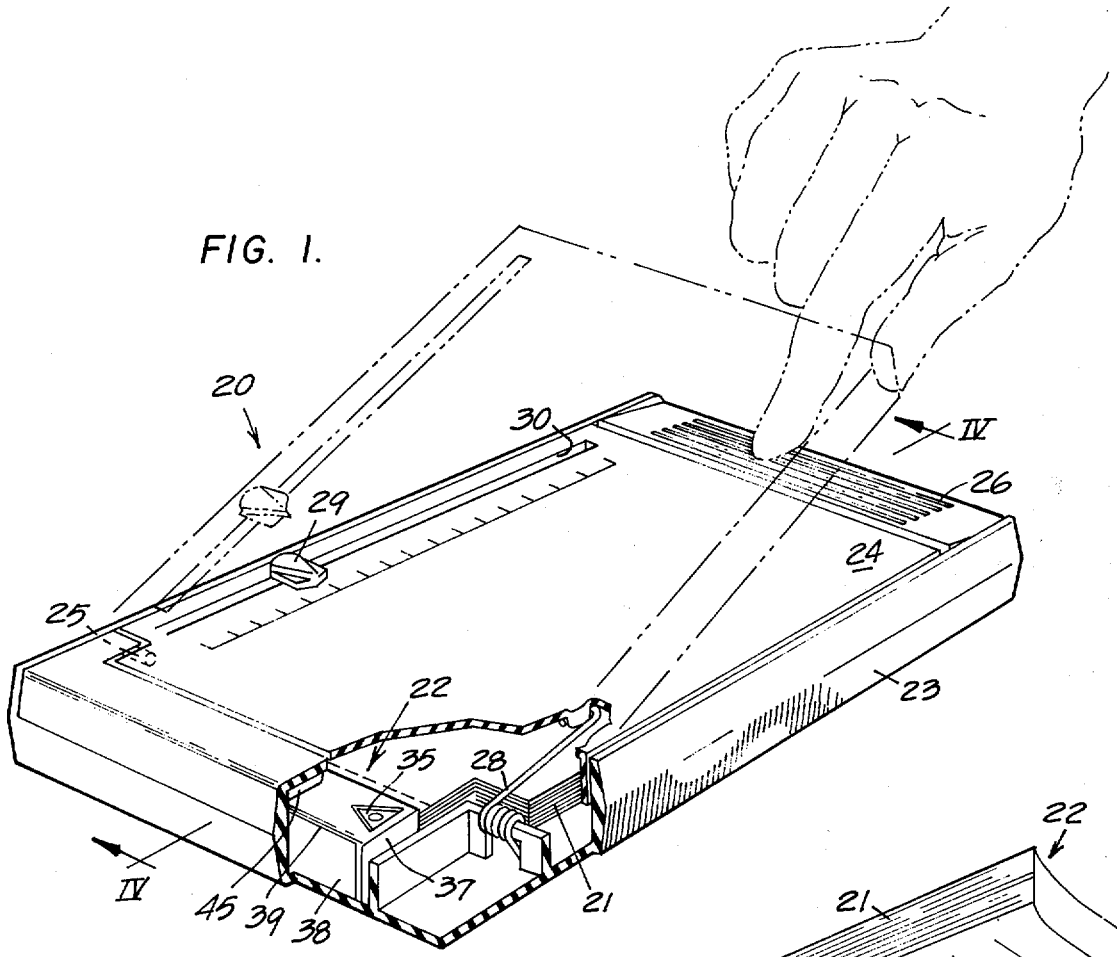
FIG. 1 is a perspective view of a list finder with portions thereof broken-away for clarification purposes.

FIG. 1 illustrates a telephone index type list finder 20 adapted to have information, such as names, addresses and/or telephone numbers, imprinted on a plurality of stacked information sheets or cards 21 of a card cartridge 22. The list finder further comprises a body member or holder 23 which defines a receptacle for removably mounting the card cartridge therein. The holder has a cover or lid 24 pivotally mounted at a forward end thereof by axially aligned pivot pins 25 (one shown). The holder and cover may each comprise a suitably composed rigid plastic or metallic material.

Figure 4:
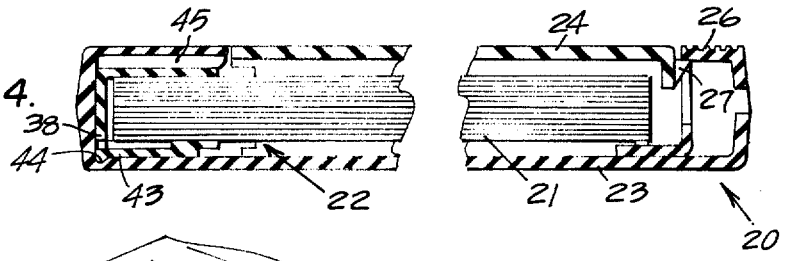
FIG. 4 is an abbreviated longitudinal sectional view of the list finder, taken in the direction of arrows IV—IV in FIG. 1.

The rearward end of the cover may be manually released from the holder by depressing a tab 26 which is cantilevered on an end of the holder, as shown in FIG. 4. Such depression releases a lug 27, formed on the cover, to permit automatic raising of the cover to its phantom line position shown in FIG. 1, under the biasing force of a torsion spring 28. One end of the spring engages a bottom panel of holder 23 whereas a second end thereof is hooked around a lug formed as an integral part of the cover.

The information cards may be individually exposed in a conventional manner by selectively moving a pointer 29 along a slot 30 formed in the cover. The pointer may thus be positioned adjacent to a selected indicia, such as a letter of an alphabetized lettering system, formed on the cover. A holding lug (not shown) is connected to the pointer to engage a selected tab 31 (FIG. 3) to permit only a selected number of the cards to be lifted to expose the desired card.

Figure 2:
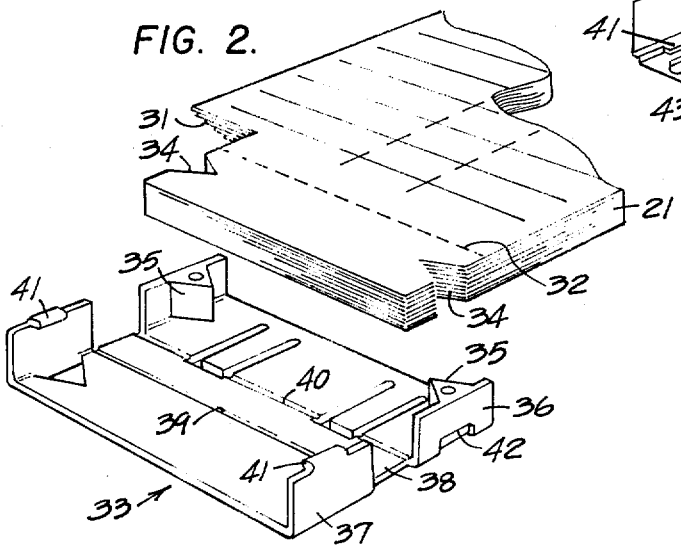
FIGS. 2 and 3 are partial exploded and assembled views, respectively, of a card cartridge, comprising a plurality of stacked information cards and a clamping device, adapted to be removably mounted in the list finder.
Figure 3:
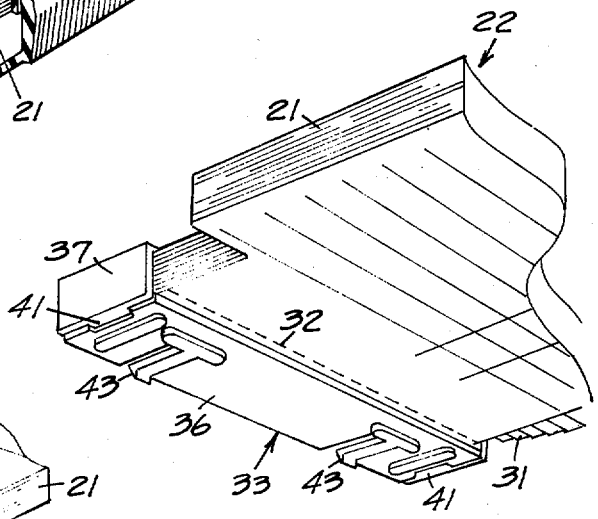

As shown in FIGS. 2 and 3, each card preferably has a hinge line 32, such as a creased or perforated scoreline, formed laterally thereacross to permit the cards to be pivoted thereat. In The FIGS. 1–4 embodiment, card cartridge 22 further comprises an articulated clamping device 33, preferably comprising a molded semi-rigid plastic material, which functions to clamp the ends of the cards together prior to their insertion into holder 23. In particular, V-shaped notches 34 are formed on the ends of the cards to seat on like formed posts or pedestals 35, formed integrally on a U-shaped bottom member 36 of the clamping device.

A U-shaped top member 37 is connected to the bottom member by an intermediate web 38 and parallel hinge or scorelines 39 and 40. The web has a width substantially equalling the composite thickness of cards 21 whereby top member 37 may be pivoted over bottom member 36 to compress the cards therebetween (FIG. 3). Locking means, shown in the form of a pair of resilient lock tabs 41 and mating slots 42 respectively formed on top and bottom members 37 and 36, retain the card cartridge in a locked position prior to its insertion into holder 23.

Upon such insertion, cantilevered and resilient hook members 43, formed on bottom member 36, engage mating notches 44 formed in the bottom plate of holder 23 (FIG. 4) to provide releasable retention means for normally preventing longitudinal and lateral displacement of the information cards. Such engagement provides cooperating retaining means, along with laterally spaced hold-down means or ribs 45 (one shown) which engage and compress top members 37 and thus the information cards, to positively retain the card cartridge in the holder. Alternatively, ribs 45 could be eliminated and such hold-down means could comprise the top surface of top member 37 which would be constructed to directly engage the flat, opposed inner surface of the holder.

FIGS. 5–12 illustrate various modifications of the card cartridge and holder wherein like numerals depict corresponding construction having similar functions. However, the numerals appearing in FIGS. 5–12 are accompanied by letters "a" through "e" to clearly identify modified constructions.

Figure 5:
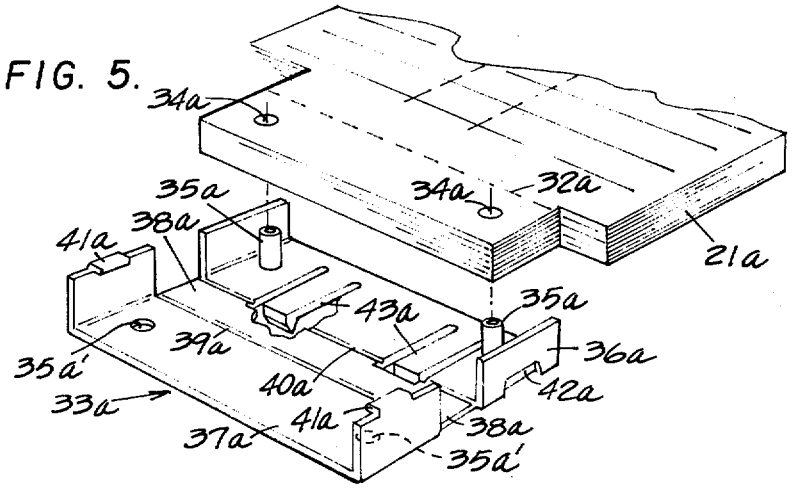
FIG. 5 is a view similar to FIG. 2, but illustrating a modification of the card cartridge.

In the FIG. 5 card cartridge embodiment, a plurality of stacked information cards 21a have holes 34a punched therethrough to facilitate mounting of the cards on vertically disposed posts or pedestals 35a, formed as an integral part of a bottom member 36a of a plastic clamping device 33a. The clamping device further comprises a top member 37a connected to the bottom member by an intermediate web 38a and parallel scorelines 39a and 40a. Upon pivoting of the top member over bottom member 36a, the ends of posts 35a will project into aligned holes 35a', formed through top member 37a, and locking means comprising resilient lock tabs 41a will snap into locked position in mating slots 42a. The FIG. 5 card cartridge may then be inserted into holder 23 (FIG. 1) to have cantilevered and resilient hook members 43a thereof engage notches 44 of the holder (FIG. 4).

Figure 6:
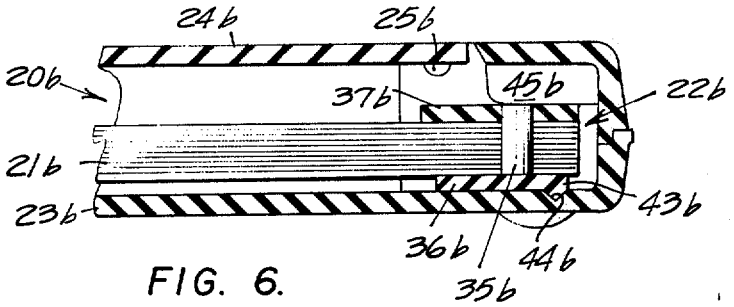
FIGS. 6 and 7 are partial sectional and exploded perspective views, respectively, illustrating another modification of the card cartridge.
Figure 7:
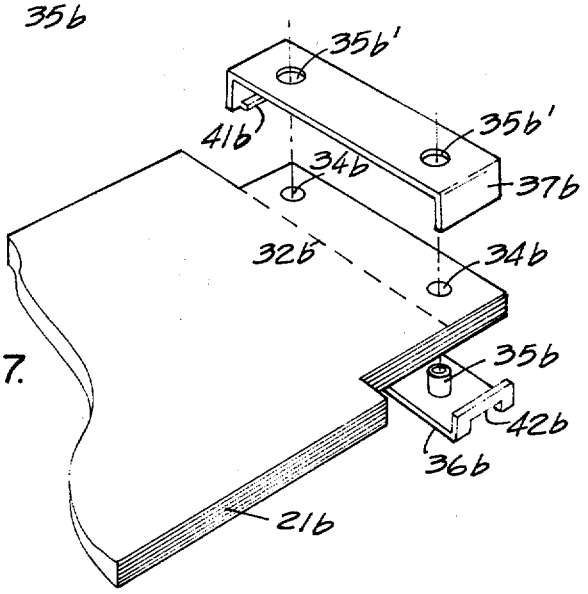

FIGS. 6 and 7 illustrate a list finder embodiment 20b having a card cartridge 22b detachably mounted in a case 23b. The card cartridge comprises a two-piece plastic clamping device having bottom and top U-shaped members 36b and 37b detachably connected together by locking means comprising resilient lock tabs 41b and mating slots 42b. Two posts or pedestals 35b are formed on bottom member 36b to project upwardly through holes 34b, formed through information cards 21b, and into apertures 35b', formed through top member 37b. Upon insertion of the card cartridge into holder 23b, resilient hook members 43b (FIG. 6), similar to aforedescribed hook members 43 and 43a, will engage like-shaped notches 44b to cooperate with hold-down means or ribs 45b to provide retaining means for positively retaining the card cartridge in the holder.

Figure 8:
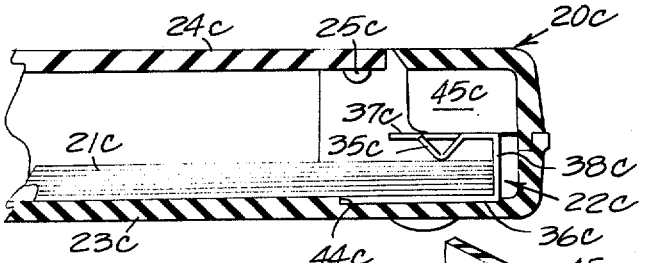
FIGS. 8 and 9 are partial sectional and exploded perspective views, respectively, illustrating another modification of the card cartridge and holder therefor.
Figure 9:
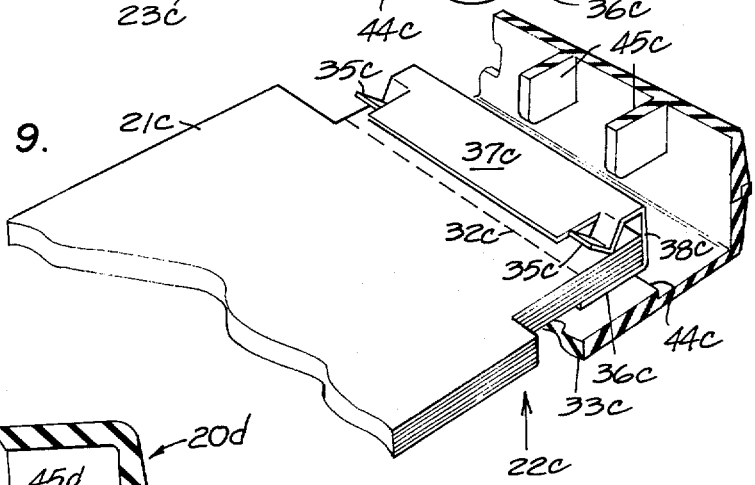

FIGS. 8 and 9 illustrate a list finder embodiment 20c comprising a card cartridge 22c removably mounted in a holder 23c. The card cartridge comprises a one-piece clamping device 33c clamped onto the forward ends of stacked information cards 21c. The clamping device comprises a flat bottom member 36c connected to a parallel top member 37c by a vertically disposed backwall 38c. The stacked cards are held in place in the clamping device by a pair of laterally spaced and V-shaped spring-like elements 35c, cantilevered on the ends of top member 37c.

Upon insertion of card cartridge 22c into holder 23c, bottom member 36c will seat in a like-shaped recess 44c formed on the bottom plate of holder 23c. In lieu thereof, spring-like elements, similar to aforedescribed resilient hook members 43, 43a and 43b, could be punched-out of bottom plate 36c to more readily facilitate removal of the card cartridge from its holder. In addition, laterally spaced hold-down means or ribs 45c will depress the upper surface of top member 37c to aid in positively retaining the card cartridge in the holder.

Figure 10:
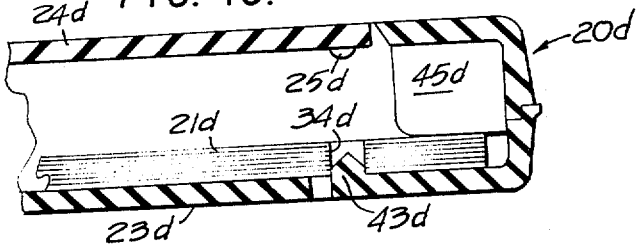
FIGS. 10 and 11 are partial sectional and exploded perspective views, respectively, illustrating another modification of the card cartridge and holder therefor.
Figure 11:
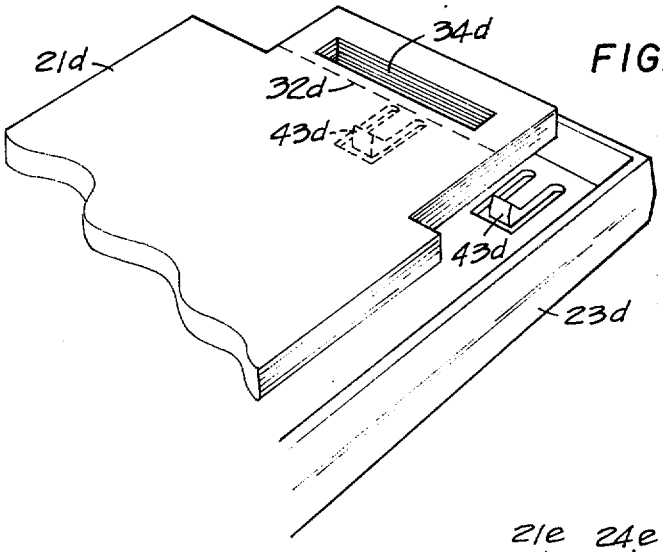

FIGS. 10 and 11 illustrate a list finder embodiment 20d wherein a plurality of stacked information cards 21d themselves solely constitute the card cartridge and have elongated slots 34d formed therethrough. The slots are disposed over resilient and cantilevered lock tabs 43d of the retaining means which are formed on the bottom plate of the holder to project upwardly through at least a substantial portion of such slots. In particular, the forward ends of the cards are initially inserted over locking means 43d to depress them downwardly to permit such ends to be positively retained under laterally spaced hold-down means or ribs 45d of the releasable retaining means.

Figure 12:
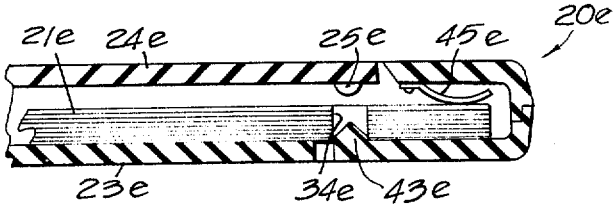
FIG. 12 is a partial sectional view illustrating another modification of the card cartridge.

FIG. 12 illustrates a list finder embodiment 20e which is substantially similar to the FIGS. 10 and 11 embodiment. However, a pair of laterally spaced resilient spring members or hold-down means 45e (one shown) are secured to holder 23e to comprise retaining means along with slots 34e and resilient lock tabs 43e to positively retain information cards 21e in the holder.

What is claimed is:

1. A list finder comprising a horizontally disposed holder having a forward end and defining a receptable therein, a card cartridge, disposed in said receptacle, comprising a plurality of stacked elongated and rectangular information cards having indicia formed thereon and releasably clamped together entirely across their forward ends by clamping means, said clamping means comprising a clamping device having top and bottom members connected together to respectively overlie and underlie the forward ends of said information cards, a normally closed cover pivotally mounted on said holder to cover said cards and means for selectively raising said cover, said cover having pointer means movably mounted thereon to selectively expose one of said information cards upon opening of said cover, and retaining means, releasably mounting a forward end of said card cartridge in the forward end of said holder for permitting composite removal of said card cartridge therefrom.

2. The list finder of claim 1 wherein each of said information cards has a hinge line formed across the width thereof, adjacent to said retaining means.

3. The list finder of claim 1 wherein said retaining means comprises hold-down means on a forward end of said holder for releasably compressing the forward ends of said card cartridge downwardly to aid in retaining it in said holder.

4. The list finder of claim 3 wherein said hold-down means comprises at least one pair of ribs formed on said holder to project downwardly towards said card cartridge.

5. The list finder of claim 4 wherein said retaining means further comprises releasable retention means disposed between a bottom plate of said holder and said card cartridge for normally preventing longitudinal and lateral displacement of said card cartridge relative to said holder.

6. The list finder of claim 5 wherein said retaining means comprises at least one resilient hook member on said card cartridge and a mating notch defined in said holder normally releasably receiving said hook member therein.

7. The list finder of claim 1 wherein said clamping device further comprises locking means releasably connecting said top and bottom members together.

8. The list finder of claim 7 wherein said locking means comprises a pair of mating resilient lock tabs and slots respectively formed on opposite ends of said top and bottom members.

9. The list finder of claim 7 wherein said clamping device further comprises an intermediate web interconnecting said top and bottom members together by parallel hinge lines.

10. The list finder of claim 9 wherein said web has a width between said hinge lines which substantially equals the composite thickness of said information cards.

11. The list finder of claim 7 further comprising a pair of vertically disposed posts secured on said bottom member to engage cut-outs formed on said information cards.

12. The list finder of claim 11 wherein said posts comprise V-shaped members positioned on lateral sides of said bottom members to engage V-shaped notches formed on respective edges of said information cards.

13. The list finder of claim 11 wherein said posts comprise cylindrically shaped members positioned on said bottom member to project through like-shaped holes formed through said information cards.

14. The list finder of claim 7 wherein said top and bottom members are separate members.

15. The list finder of claim 1 wherein said retaining means comprises at least one resilient hook member on said clamping device and a mating notch defined in said holder normally releasably receiving said hook member therein.

16. The list finder of claim 1 wherein said clamping device constitutes a one-piece member comprising a top member, a bottom member and a pair of spring-like elements cantilevered on the ends of said top member to compress said information cards between said elements and said bottom member.

17. The list finder of claim 1 wherein said retaining means comprises a notch formed in a bottom plate of said holder seating the bottom member of said clamping device therein.

* * * * *